US007359544B2

(12) United States Patent
Gao et al.

(10) Patent No.: US 7,359,544 B2
(45) Date of Patent: Apr. 15, 2008

(54) AUTOMATIC SUPERVISED CLASSIFIER SETUP TOOL FOR SEMICONDUCTOR DEFECTS

(75) Inventors: Lisheng Gao, Morgan Hill, CA (US); Bo Magluyan, Los Gatos, CA (US); Jianxin Zhang, Santa Clara, CA (US); Kevin Yeung, Sunnyvale, CA (US); Kenong Wu, Davis, CA (US); Tong Huang, San Jose, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 992 days.

(21) Appl. No.: 10/713,628

(22) Filed: Nov. 13, 2003

(65) Prior Publication Data

US 2004/0156540 A1 Aug. 12, 2004

Related U.S. Application Data

(60) Provisional application No. 60/447,360, filed on Feb. 12, 2003.

(51) Int. Cl.
*G06K 9/00* (2006.01)
*G06K 9/62* (2006.01)

(52) U.S. Cl. ..................... 382/145; 382/224
(58) Field of Classification Search ......... 382/141–153
See application file for complete search history.

(56) References Cited

U.S. PATENT DOCUMENTS 5,325,445 A * 6/1994 Herbert ............... 382/225
5,440,649 A * 8/1995 Kiyasu et al. ........... 382/147
5,991,699 A 11/1999 Kulkarni et al. .......... 702/83
6,104,835 A 8/2000 Han ...................... 382/225
6,233,719 B1 * 5/2001 Hardikar et al. ............ 716/1
6,408,219 B2 * 6/2002 Lamey et al. ............. 700/110
6,456,951 B1 * 9/2002 Maeda et al. ............. 702/81
6,473,665 B2 * 10/2002 Mugibayashi et al. ..... 700/110
6,597,381 B1 * 7/2003 Eskridge et al. .......... 715/804
6,910,035 B2 * 6/2005 Hoekman et al. .......... 707/4
6,913,466 B2 * 7/2005 Stanfield et al. .......... 434/219
2002/0159643 A1 * 10/2002 DeYong et al. ........... 382/228

FOREIGN PATENT DOCUMENTS

WO WO01/40145 A2 7/2001

* cited by examiner

*Primary Examiner*—Bhavesh M Mehta
*Assistant Examiner*—Hadi Akhavannik
(74) *Attorney, Agent, or Firm*—Beyer Weaver LLP

(57) ABSTRACT

Disclosed are methods and apparatus for efficiently setting up and maintaining a defect classification system. In general terms, the setup procedure optionally includes automatically grouping a set of provided defects and presenting a representative set from each defect group to the user for classification. After the initial manual classification of the representative defects, the setup procedure includes an automatic procedure for classifying the non-reviewed or unclassified defects based on the manual class codes from the user-reviewed defects. After the automatic classification operation, the user may also be presented with defects from each class which may require re-classification. In particular embodiments, the user is iteratively presented with defects which have classifications that are suspect, which are near classification boundaries, or have classifications that have a low confidence level until each class is pure or contains a same type of defect classes as assigned by the user.

44 Claims, 11 Drawing Sheets

AUTOMATIC SUPERVISED CLASSIFIER SETUP TOOL FOR SEMICONDUCTOR DEFECTS

CROSS REFERENCE TO RELATED APPLICATIONS

This application claims priority of U.S. Provisional Application No. 60/447,360, filed on 12 Feb. 2003, which application is herein incorporated by reference in its entirety for all purposes.

BACKGROUND OF THE INVENTION

The present invention relates generally to inspection of semiconductor devices, such as test structures and other types of semiconductor structures. More specifically, it relates to techniques for classifying defects found on integrated circuit devices.

Semiconductor defects may include structural flaws, residual process material and other surface contamination which occur during the production of semiconductor wafers. Defects are typically detected by a class of instruments called inspection tools. Such instruments automatically scan wafer surfaces and detect, and record the location of anomalies using a variety of techniques. This information, or "defect map," is stored in a computer file and sent to a defect review station.

Using the defect map to locate each defect, a human operator observes each defect under a microscope and classifies each defect according to class (e.g., particle, pit, scratch, or contaminant). Information gained from this process is used to correct the source of defects, and thereby improve the efficiency and yield of the semiconductor production process. Problems with this classification method include the technician's subjectivity in identifying the defect class, and the fatigue associated with the highly repetitive task of observing and classifying these defects.

Methods of automatically classifying defects, collectively known as Automatic Defect Classification or "ADC," have been developed to overcome the disadvantages of manual defect classification. A conventional ADC system uses image processing techniques to first detect the defect and then to classify the defect according to the defect's physical characteristics and background geometry. Comparing these physical characteristics to the physical characteristics of pre-classified defects in a training set permits automated defect classification.

While this system reduces technician fatigue and increases the number of defects that can be classified per unit time once the training set has been generated, such training set programs sometimes fail to provide an accurate classification for some defects. The setup of the training set typically is time consuming because it requires the manual classification of thousands of defects. During this manual classification process, the user is often presented with thousands of substantially similar defects which require individual manual classification. Needless to say, this process requires a significant amount of man-hours for a user to set up the training set.

Accordingly, there is a need for improved mechanisms for more efficiently setting up an automatic defect classification system. Additionally, there is a need for optimizing and efficiently maintaining an existing classification system.

SUMMARY OF THE INVENTION

Accordingly, mechanisms are provided for efficiently setting up and maintaining a defect classification system. In general terms, the setup procedure optionally includes automatically grouping a set of provided defects (e.g., defect images) and presenting a representative set from each defect group to the user for classification. Alternatively, a representative set from the whole defect set may be presented to the user for classification without first grouping the defects into groups. The representative set does not include all of the defects and is selected to optimize manual classification efficiency. After the initial manual classification of the representative defects, the setup procedure includes an automatic procedure for classifying the non-reviewed or unclassified defects based on the manual class codes from the user-reviewed defects. After the automatic classification operation, the user may also be presented with defects from each class which may require re-classification. In particular embodiments, the user is iteratively presented with defects which have classifications that are suspect, which are near classification boundaries, or have classifications that have a low confidence level until each class is pure or contains a same type of defect classes as assigned by the user.

In one embodiment, a method of setting up an automatic defect classifier system for classifying semiconductor defects. Defect image data is provided, e.g., from an defect review system. The defect image data is then grouped (e.g., using a natural grouping procedure) into a plurality of groups of one or more defects. A representative set of defects from each group is then determined so as to optimize manual classification. The representative set of defects from each group and not the defects which are not part of the representative set from each group are then presented to a user for manual classification. The defects which are not part of the representative set from each group are defined as non-reviewed defects.

In a further embodiment, the following method operations are performed: (a) determining a probable class for each non-reviewed defect based on the manual classifications by the user (e.g., using a nearest neighbor procedure); (b) determining a representative set of defects from each probable class which include defects having a probable class with a lowest confidence level within such probable class; (c) presenting the representative set of defects from each probably class to the user for possible re-classification; and (d) repeating steps (a) through (c) until all defects within the representative set of defects from each probable class have a same class, wherein the repetition of the determination of the probable class is based on the manual classifications and the re-classification by the user.

In another aspect, it is determined whether manual classification is present already for some of the defects, and the defects are grouped and the representative sets are presented only when there is no manual classification present. In one aspect, each representative set of defects is a manageable subset of defects from group's total defects. In another aspect, determining the representative set of defects for each group includes selecting only a single defect from among defects which are substantially similar to be included within the representative set for such group. In another implementation, determining the representative set of defects for each group includes selecting defects which are uniformly distributed among the group's defects to be included within the representative set for such group. In yet another aspect, determining the representative set of defects for each group includes selecting defects which are the most diverse from the group's defects to be included within the representative set for such group.

In yet another implementation, determining the representative set of defects for each group includes (1) when the defects for the each group total less than three, selecting all of the defects from the each group to be included within the representative set for such group; and (2) when the defects for the each group are equal to three or more, selecting defects based on the max/min algorithm until ¼ of the defects from the each group are selected.

In a further aspect, determining the representative set of defects from each probable class includes (1) determining a confidence level for each non-reviewed defect in each probable class; and (2) selecting the non-reviewed defects from each probable class which have the lowest confidence level for inclusion in the representative set for such probable class. In a specific implementation, the confidence level for each non-reviewed defect within each probable class is equal to a minimum distance between the each non-reviewed defect and two of the nearest classified defects divided by a maximum distance between the each non-reviewed defect and two of the nearest classified defects.

In a further embodiment, when there is manual classification present the method includes the operations (1) when there is a training set present, using the training set as a reference to detect new defects in other unclassified defects; (2) when there is not a training set present, using the classified defects as reference defects to detect new defects from other unclassified defects; (3) when new defects are found, grouping the new defects and presenting to the user for classification; and (4) when new defects are found, repeating operations (a) through (c) after the new defects are classified.

In another embodiment, a classifier system for classifying unclassified defects is created when the user selects an option for creating the classifier system. Creating the classifier system is accomplished by repeating the operations for grouping, presenting the representative set from each group; and operations (a) through (c). The classified defects are used as reference defects for classifying unclassified defects as part of the classifier system, when the user selects a supervisor mode. Creating the classifier further includes using at least a portion of the classified defects as reference defects for classifying unclassified defects as part of the classifier system when the user selects an existing manual classification mode and using a grouping procedure for classifying unclassified defects as part of the classifier system when the user selects an unsupervised mode.

In a further aspect, when the existing manual classification mode is selected, purity and accuracy matrices for a classifier are presented based on (1) an existing training set, (2) a training set selected using the max/min algorithm (3) a training set combining the existing training set and a training set selected using the max/min algorithm. A classifier is then created based on the user's selected from among the three classifiers.

In another aspect, the invention pertains to a computer system operable to set up an automatic defect classifier system for classifying semiconductor defects data. The computer system includes one or more processors and one or more memory. In yet another aspect, the invention pertains to a computer program product for setting up an automatic defect classifier system for classifying semiconductor defects. The computer program product includes at least one computer readable medium and computer program instructions stored within the at least one computer readable product configured to perform one or more of the above described inventive procedures.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
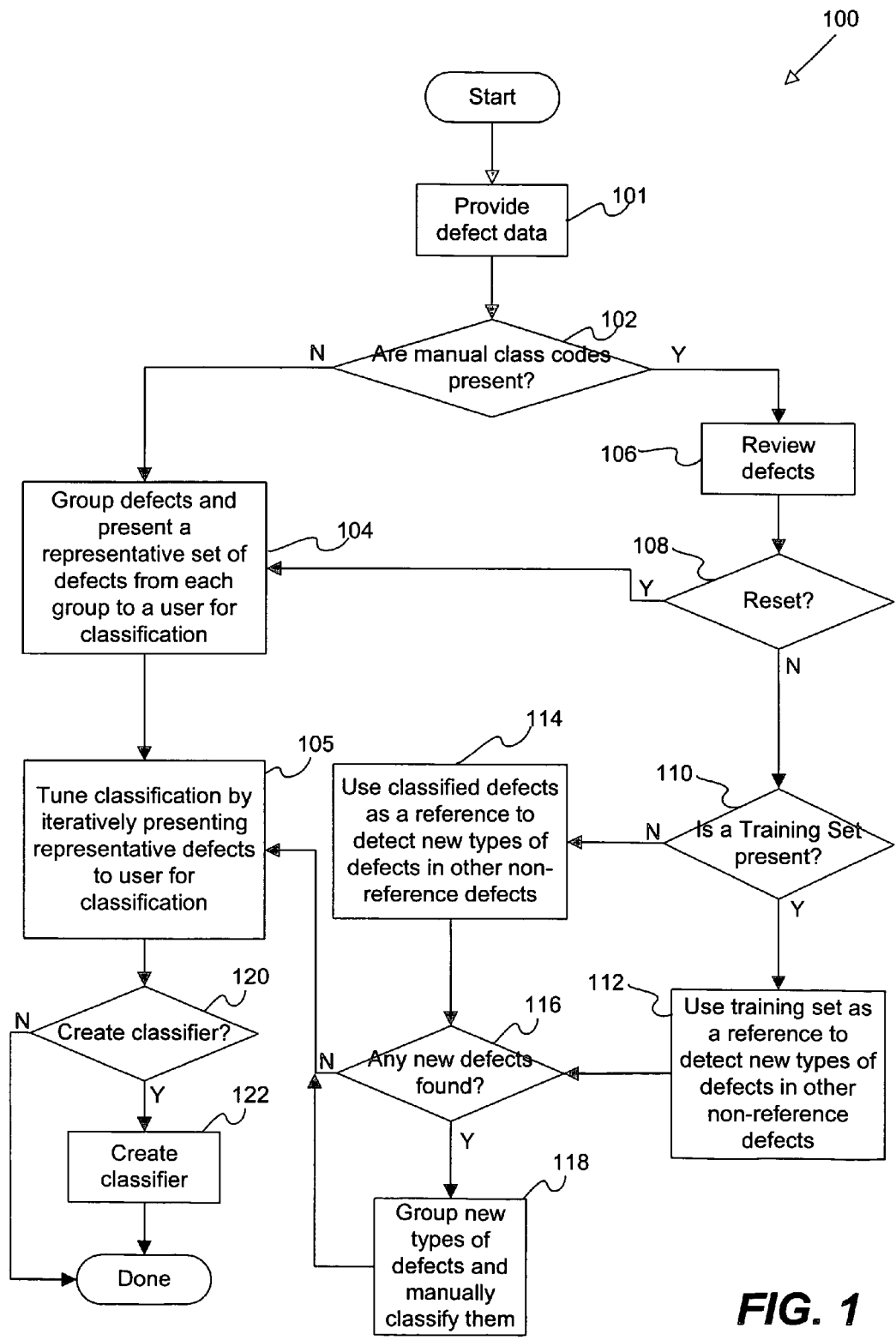
FIG. 1 is a flowchart illustrating a procedure for increasing the efficiency of manual classification in setting up a classification system in accordance with one embodiment of the present invention.

FIG. 1 is a flowchart illustrating a procedure 100 for increasing the efficiency of manual classification in setting up a classification system in accordance with one embodiment of the present invention. Initially, defect data is provided in operation 101. Defect data is typically provided in the form of images obtained from a high resolution review tool, such as an electron microscope. One example of a review tool is the eV300 E-beam Defect Review tool available from KLA-Tencor of San Jose, Calif. Typically, a semiconductor product, such as a product wafer or test wafer (or a device), is inspected for defects and a defect map is provided. The defect map is then used to obtain a high resolution image of each located defect, e.g., using the review tool.

After defect image data is provided, it may then be determined whether there are any manual class codes present in operation 102. In other words, it is determined whether a user has already manually classified a set of defects. If there are no manual class codes, a manual classification procedure will then be initiated in combination with an automatic process to increase the efficiency of such manual classification procedure. In general terms, techniques are provided so as to help a user efficiently classify a manageable subset of defects. First, the defects may be automatically grouped and a representative set of defects from each group is presented to a user for classification in operation 104. However, this grouping operation is optional and may be skipped. Alternatively, a representative set from the whole defect set may be presented to the user for classification without first grouping the defects into groups.

Figure 2:
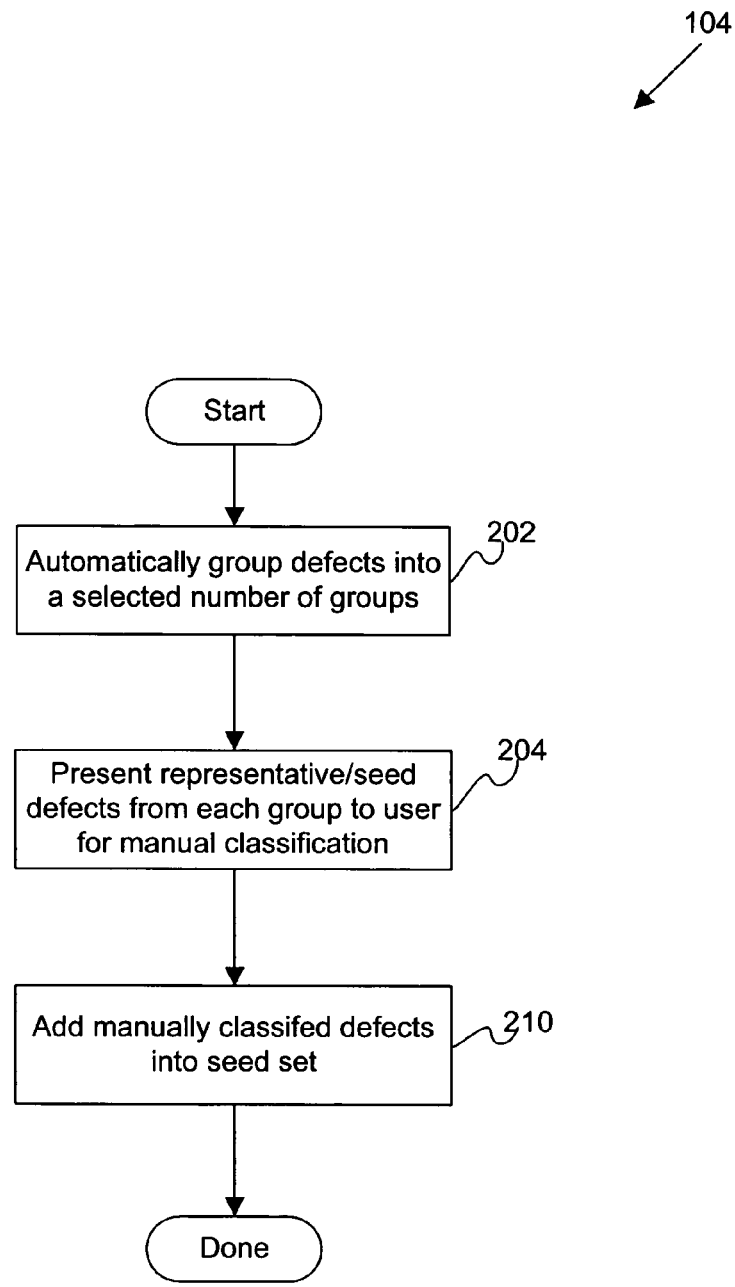
FIG. 2 is a flowchart illustrating the operation of FIG. 1 for grouping defects and presenting representative defects from each group to a user for manual classification in accordance with embodiment of the present invention.

FIG. 2 is a flowchart illustrating the operation 104 of FIG. 1 for grouping defects and presenting representative defects from each group to a user for manual classification in accordance with embodiment of the present invention. Initially, the defects are automatically grouped into a selected number of groups in operation 202. In the illustrated embodiment, the user may select the number of groups. Alternatively, the number of groups may be pre-defined. Representative or seed defects are then presented from each group to the user for manual classification in operation 204.

Any suitable grouping technique may be implemented to group or cluster similar defects. Several grouping techniques are further described in U.S. Pat. No. 5,991,699 by Ashok V. Kulkarni et al. issued 23 Nov. 1999 and International Application No. PCT/US00/32635 filed 29 Nov. 2000 published 7 Jun. 2001, which are both incorporate herein by reference in their entirety for all purposes.

In one example implementation, a natural grouping procedure or algorithm may be implemented to group the defects into a selected or predefined number of groups. A natural grouping algorithm typically includes first obtaining a feature vector for each defect image. The feature vector may include any suitable number and type of quantifiable image characteristics, such as defect shape, defect size, defect intensity, background intensity, etc. The feature vectors are then plotted in N-dimensional space (where N is the number of vector parameters) and spatially clustered or grouped based on each vectors relative position in such space.

Figure 3A:
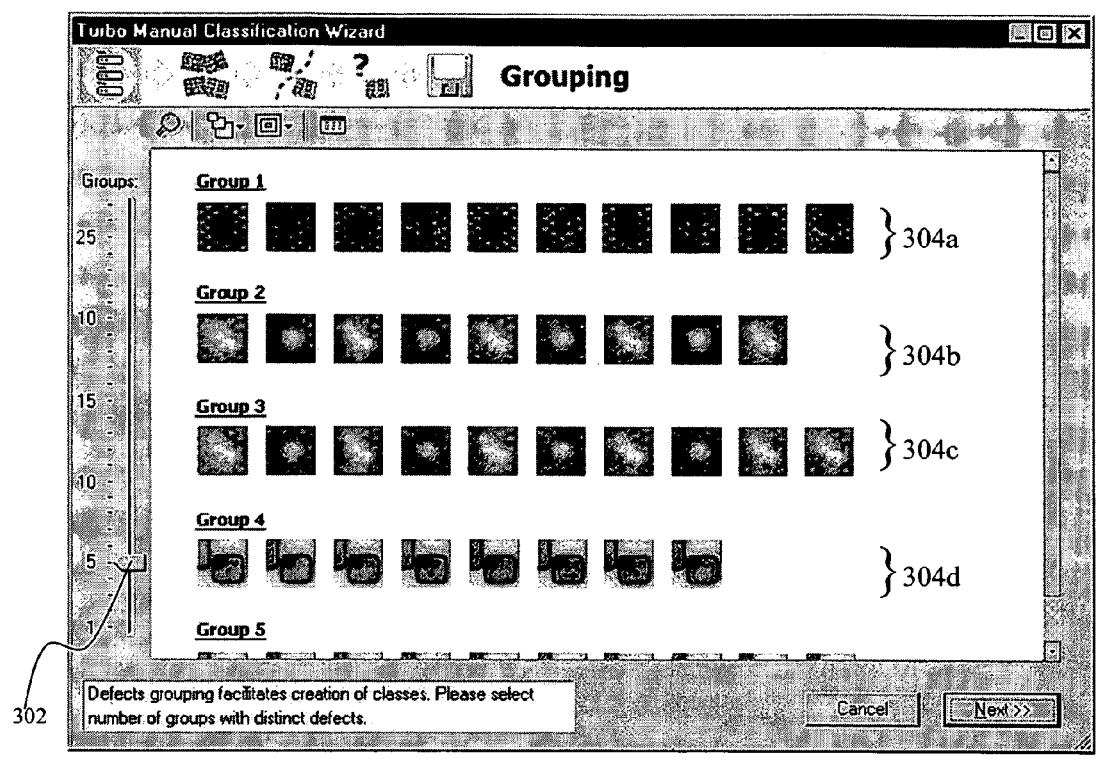
FIG. 3A is a screen shot showing representative sets of defects from a selected number of groups.

FIG. 3A is a screen shot showing a representative sets of defects 304 from a selected number of groups (Groups 1~5 are shown). The user may select or adjust the total number of groups by any suitable mechanism such as the illustrated slide bar 302. Other common input device types include an entry box for entering a specific number, a dial or knob for selecting a particular number, and a set of buttons for selecting from a plurality of fixed numbers. In the illustrated embodiment, the total number of groups 302 is set to five by slider 302.

Representative defects from each group are presented to the user. Viewing the representative defects, the user may continue to adjust the total group number until he/she is satisfied that the presented defects are divided among a correct number of groups. For example, when each group has similar types of defects, the user may determine that total group number is set correctly. Otherwise, when one or more groups contain significantly differing defect types, the user may adjust the total group number. In the illustrated example, group1 304a has 10 representative defects having a similar appearance; group2 304b has 9 representative defects having a similar appearance; group3 304c has 10 representative defects having a similar appearance; and group4 304d has 8 representative defects having a similar appearance (group5 is not visible and may be seen by scrolling down).

The representative defects generally include a minimum set of defects that require user classification. For instance, when there is a plurality of nearly identical defects within a group, a single defect from this identical set is selected to be included in the representative set for such group. Additionally, boundary defects or the most different defects within a group are typically selected as part of the representative set.

Any suitable algorithm may be used to determine the representative defects for each group presented to the user for classification. The algorithm is selected to present a non-redundant and diverse set of defects for each group that maximizes diversity (i.e., presents the most diverse set of defects for each group). The representative set may also be selected to include defects which are uniformly distributed among the group's defects. In a specific implementation, the following algorithm is used to select the representative set for each group:

(i) If the defect number for the group is less than 3, select all defects from such group;

(ii) the maximum number of defects to be selected must be less than 10 defects for the group;

(iii) select defects based on the following formula if condition (i) has not been met and (until condition (ii) has been reached or until ¼ of the defects for such group has been selected: $\max\{\min(d_1, \ldots d_n)\}$ for all defects n, where d is the distance between a defect that has yet not been selected as a representative defect and a representative defect, (herein referred to as the "max/min algorithm").

Figure 3B:
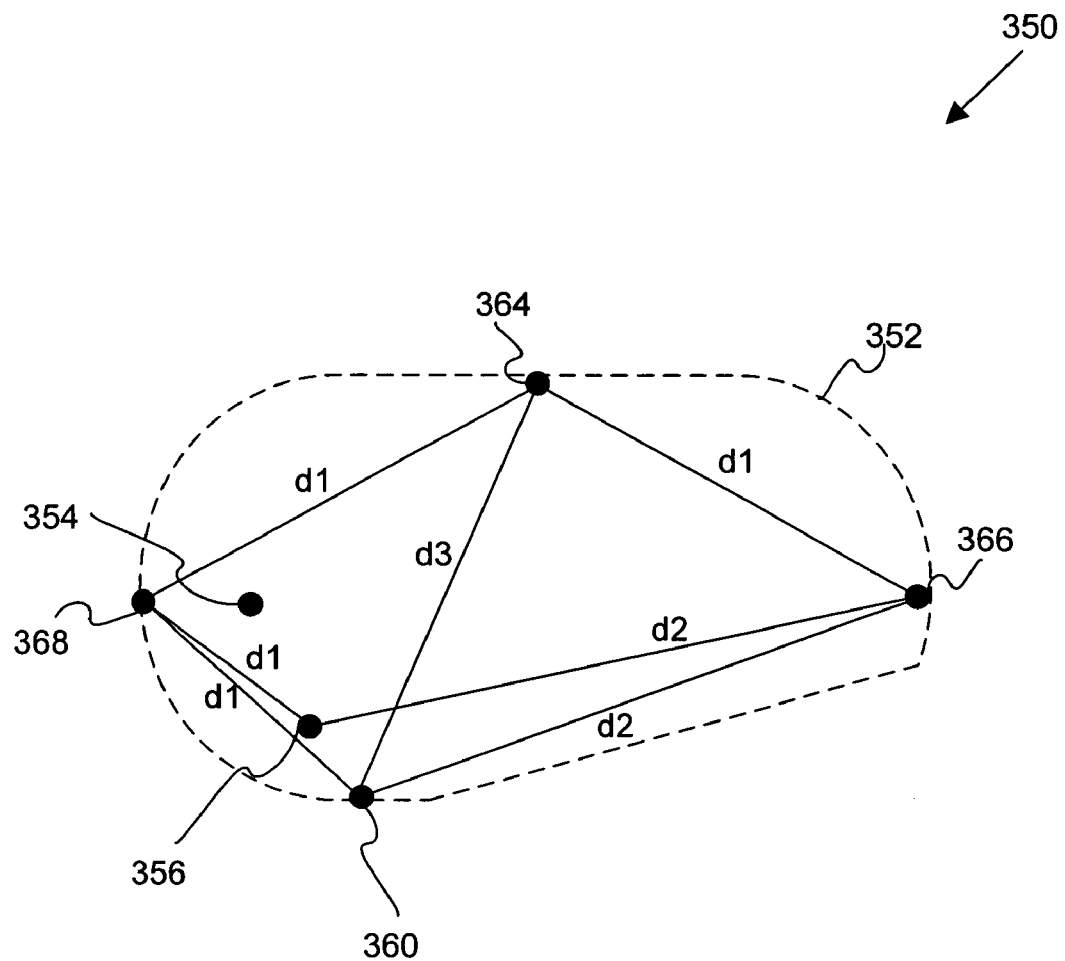
FIG. 3B illustrates the application of the max/min algorithm to a plurality of defects in a particular group in order to select a representative set of defects from such group in accordance with one embodiment of the present invention.

FIG. 3B illustrates the application of the max/min algorithm to a plurality of defects in a particular group 352 in order to select a representative set of defects from such group in accordance with one embodiment of the present invention. Initially, a random defect 354 is selected. Next, the defect that is located a farthest distance (in feature space) from the initial defect 354 is selected as a representative defect. As shown, defect 366 is the defect located the farthest from the initial defect 354. The initial defect 354 is then thrown out and not used in the representative set (at least initially). A second defect that is located the farthest distance from the first representative defect 366 is then selected. In the illustrated example, defect 368 is the second representative defect.

The next defect which has the maximum minimum of the two distances to the two representative defects is next selected as part of the representative set. As shown, defect 360 is located a distance d1 from representative defect 368 and a distance d2 from representative defect 366. Likewise, defect 356 is located a distance d1 from representative defect 368 and a distance d2 from representative defect 366. Defect 364 is located a distance d1 from representative defect 368 and a distance d2 from representative defect 366. For each potential representative defect, a minimum distance (d1 or d2) is determined. The minimum distance for defect 360 is d1; the minimum distance for 356 is d1, and the minimum distance for defect 364 is d1 in the illustrated example. Out of these three potential representative defects 360, 356, and 364, defect 364 has the maximum minimum distance (d1). That is, the minimum distance d1 for defect 364 (to representative defect 366) is greater than both the minimum distance d1 for defect 360 (to representative defect 368) and the minimum distance d1 for defect 356 (to representative defect 368). Accordingly, defect 364 is chosen as the third representative defect. The defect which has the maximum minimum distance to these three representative defects is then selected as the next representative defect (e.g., defect 360), and this process is repeated until a ¼ of the group defects are selected or the maximum of 10 is reached.

In another technique, one may select the representative defects for a relatively tightly clustered group to include a defect in the center of the group and defects distributed along the outside border of the group at regular intervals. In more loosely clustered groups, one may select defects through the interior space which are evenly distributed at regular intervals from the center to the outside boundary. The intervals may be determined through experimentation to determine which interval values lead to more accurate classification schemes.

Referring back to FIG. 2, after manual classification, the manually classified defects are then added into a seed set in operation 210. The seed set is later used to tune the classification scheme of the defects as described further below.

After the representative defects from each group are manually classified by the user, the classification is then tuned by iteratively presenting representative defects to the user for classification in operation 105 of FIG. 1. The initial set of manually classified defects (e.g., obtained in operation 210 of FIG. 2) is used as the initial seed set. This seed set of classified defects is generally adjusted until it can be used to automatically and accurately classify other defects which have not been reviewed and manually classified by the user.

Figure 4:
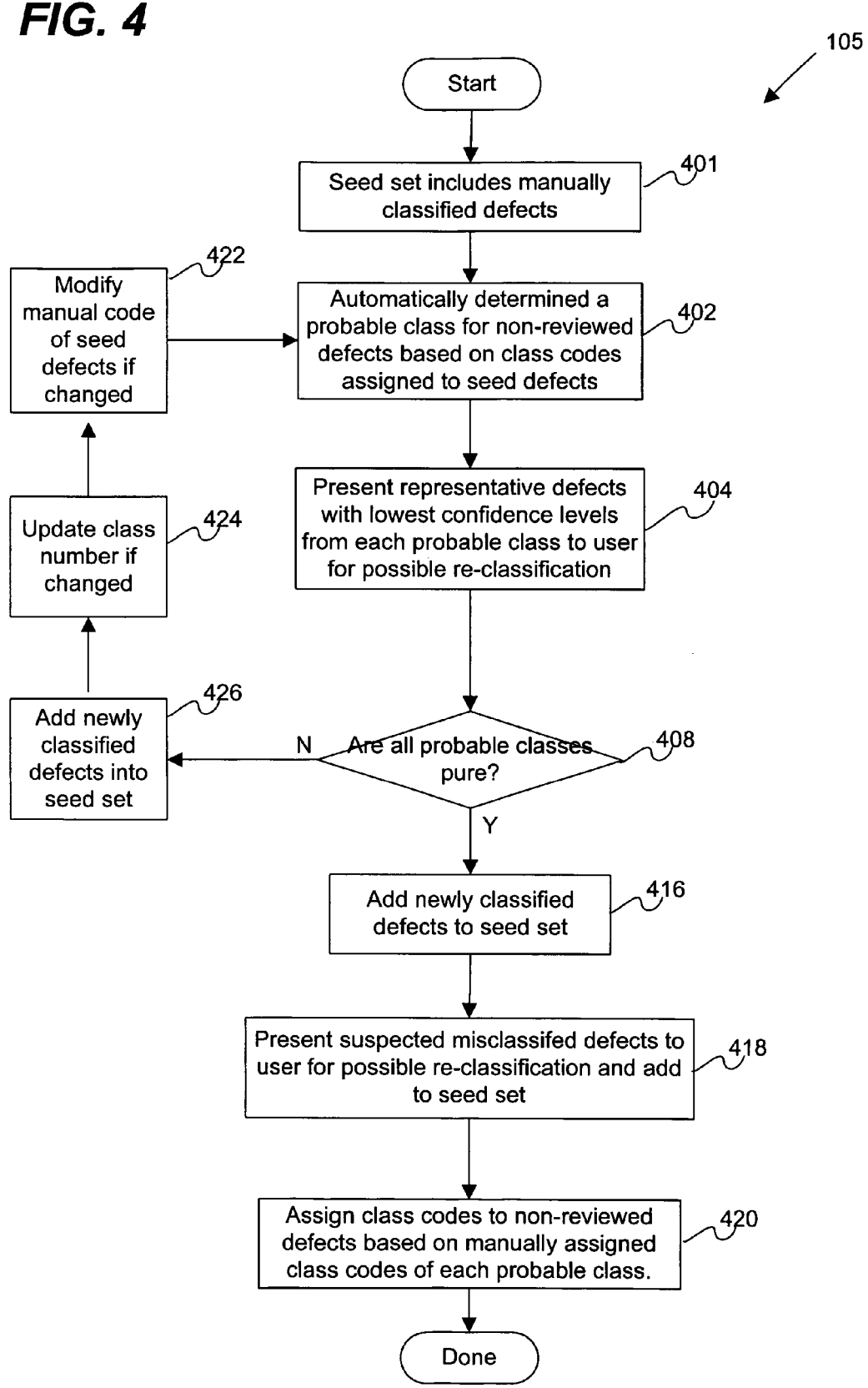
FIG. 4 is flowchart illustrating the operation of FIG. 1 for tuning the seed set of classified defects in accordance with one embodiment of the present invention.

FIG. 4 is flowchart illustrating the operation 105 of FIG. 1 for tuning the seed set of classified defects in accordance with one embodiment of the present invention. In operation 401, the seed set initially includes the manually classified defects. The non-reviewed defects which have not been manually classified are automatically divided into a plurality of probable classes based on the class codes manually assigned to the seed set defects in operation 402. Any suitable procedure may be implemented to classify defects based on an initial classified seed set of defects. For example, a neural net procedure or algorithm may be implemented.

By way of another example, a nearest neighbor procedure or algorithm may be utilized. In general terms, an unknown input image is assigned a classification code equal to a defect having the most similar feature vector within the feature space. Several nearest neighbor embodiments are further described in U.S. Pat. No. 6,104,835 by Ke Han issued 15 Aug. 2000, which patent is incorporated herein by reference in its entirety for all purposes.

Representative defects having the lowest confidence levels are then presented from each probable class to the user for possible re-classification in operation 404. In general terms, the boundary defects from each probable class are presented for possible re-classification. In a specific implementation, the following algorithm is used to determine the confidence level of each classified defect and the five defects having the lowest confidence value are then selected:

$$\text{confidence value} = 1 - \frac{d_1}{d_2} \quad \begin{array}{l}\text{(herein referred to as the}\\ \text{``confidence algorithm'')}\end{array}$$

where $d_1$ represents the distance between the unknown defect and its nearest seed defect $D_s$ and $d_2$ represents the distance between the unknown defect and its second nearest seed defect which has a different manual code than the seed defect $D_s$.

Figure 5:
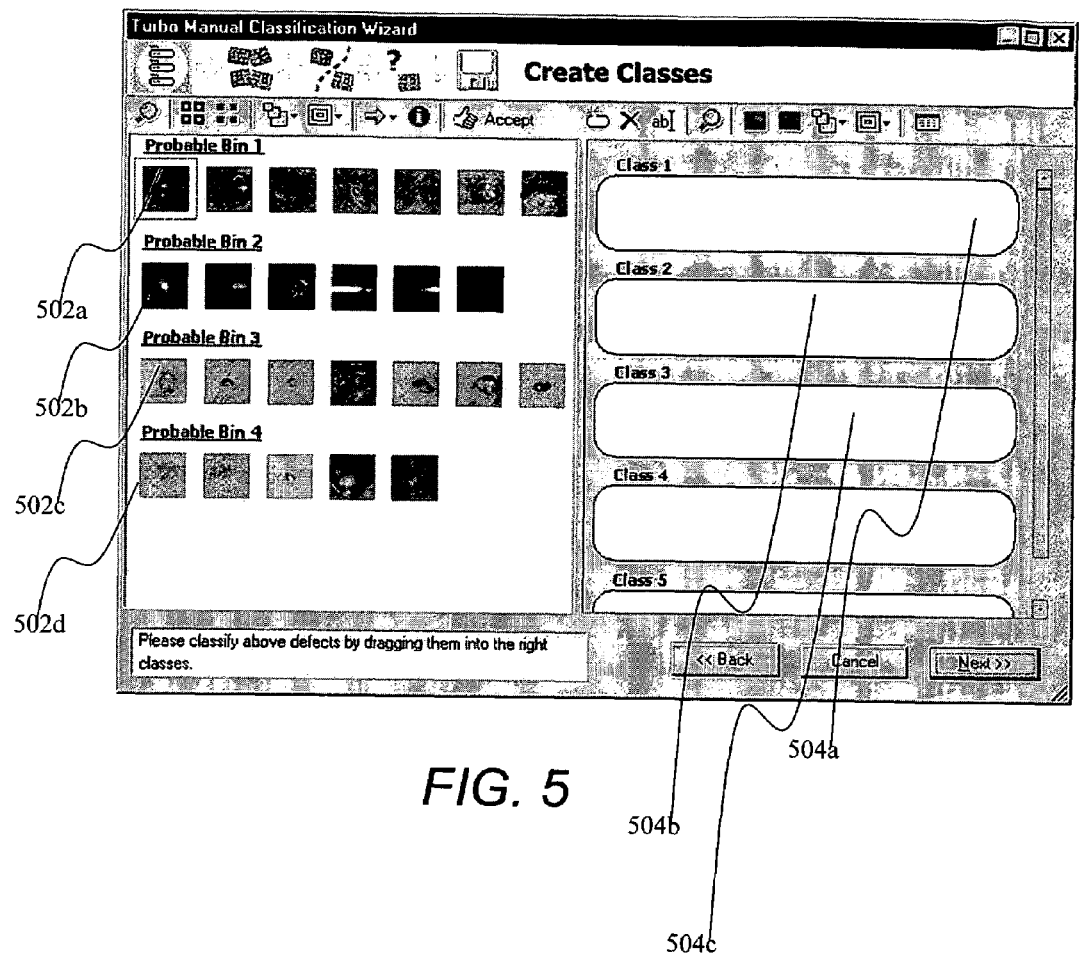
FIG. 5 illustrates a screen shot showing an example set of probably classes (or "probable bins") each having a set of representative defects presented to the user for possible reclassification.

FIG. 5 illustrates a screen shot showing an example set of probably classes (or "probable bins") 502 each having a set of representative defects presented to the user for possible reclassification. Any suitable input mechanism may be utilized to allow the user to reclassify the representative set of defects from each probable class. As shown in FIG. 5, the user interface includes a set of class identifiers 504, along with images of the representative defects from each probable class 502. Alternatively, the user may be sequentially presented with each probable group's representative defects for possible re-classification. The user may reclassify any of the represented defects 502 by selecting a new class 504 for any of defects 502. In a specific implementation, the user may select all or a portion from each probably bin 502 for placement into a particular class by selecting, dragging, and dropping the defects into the appropriate class identifier 504. The user may also change the number of classes by setting up a new class identifier.

The illustrated interface for re-classifying representative defects from probable classes is not meant to limit the scope of the invention. Other types of interfaces are also contemplated. In another example, the interface may simply include an entry box for each defect in which the user may change the determined probable class code. For instance, a defect may be proximate to an entry box having a probable class code equal to "1", and the user may change this class code to a class code equal to "2."

Referring back to FIG. 4, after the user reclassifies as necessary, it is then determined whether all probable classes are still pure in operation 408. If the probable classes are not pure, the newly classified defects are then added into the seed set in operation 426. That is, when the classes contain all the same class of manually classified defects, the class is deemed to be pure. The class number may also be updated, e.g., if changed by the user in operation 424. The manual class code of the seed defects may also be modified, e.g., if changed by the user, in operation 422. Probable classes may then be automatically determined again for the new seed defects and a representative set from each probably class is presented to the user for possible reclassification in operations 402 and 404, respectively. These two operations are repeated until all the probable classes are determined to be pure.

When all probable classes are pure, the newly classified defects are then added to the seed set in operation 416. Suspected misclassified defects are then presented to the user for possible re-classification in added to the seed set in operation 418. In one implementation, defect classifications which have a confidence level below a predetermined value are defined as suspected misclassified defects. Class codes are then assigned to non-reviewed defects based on manually assigned class codes of each probable class in operation 420 and the tuning procedure ends.

Referring back to FIG. 1, after the setup of the classification system is tuned, it may then be determined whether the user wishes to create a classifier in operation 120. For example, the user may be presented with the option of creating a classifier (e.g., a classifier creation input button). If a classifier is not to be created, the procedure 100 ends. If a classifier is to be created, a classifier is created in operation 122. This classifier creation operation 122 generally includes creating a classifier based on one or more portions of the manually classified defects and maintaining such classifier, which is described further below. The procedure 100 then ends.

Referring back to operation 102 of FIG. 1, if there are manual class codes already present, the defects may then be reviewed in operation 106, instead of proceeding through a manual classification process (operations 104 and 105). The user may then determine whether to reset the manual class codes in operation 108. If the manual class codes are to be reset, the procedure 100 goes to operation 104, where the defects are grouped again for user classification.

If the manual class codes are not to be reset, it is then determined whether a training set is present in operation 110. If a training set is already present, the training set may be used as a reference to detect new types of defects in other non-reference defects in operation 112. If a training set is not present, the classified defects may be used as a reference to detect new defects in other non-reference defects in operation 114. In either case, it may then be determined whether new defects have been found in operation 116. If new defects have not been found, the classification scheme may be further tuned in operation 105. If new defects are found, the new defects may then be grouped and manually classified in operation 118, and these classifications are then tuned in operation 105.

This new defect detection procedure is useful for classifier maintenance. New defects may be found by any suitable procedure using the provided training set. One example procedure includes:

(i) A training set T and a defect set V (maybe from a new wafer) are provided;

(ii) For every defect x in set V, let dt indicate the distance from x to T (minimum distance to every defect in T) and dv indicate the distance to its nearest neighbor in V.

(iii) Let r=dv/dt.

(iv) If dt>t1 and r<t2, where t1 and t2 are predefined fixed thresholds, x is defined as a new defect.

Figure 6:
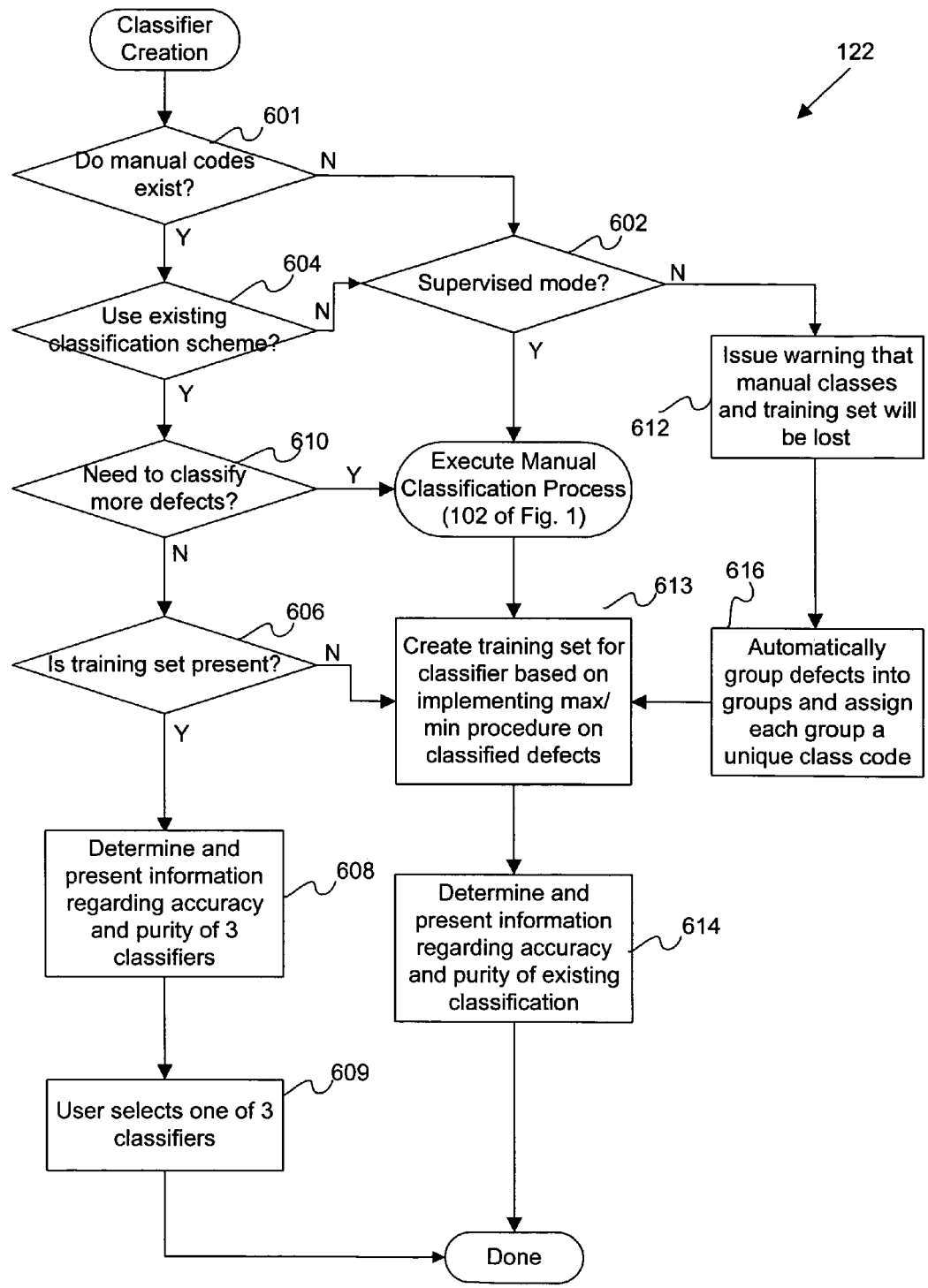
FIG. 6 is a flowchart illustrating a procedure for creating a classifier in accordance with one embodiment of the present invention.

After manual classification is complete, classifier creation may be initiated by the user in several different modes, e.g., using the manually classified codes or not. In the following illustrated embodiment, the user may choose between several different classifier creation techniques. Alternatively, the classification creation technique may be fixed. FIG. 6 is a flowchart illustrating a procedure for creating a classifier system in accordance with one embodiment of the present invention. Initially, it is determined whether manual class codes exist in operation 601. If manual class codes exist, it is then determined whether the existing classification scheme is to be used in operation 604. For example, the user may choose to use the existing classified defects as the classifier.

Figure 7:
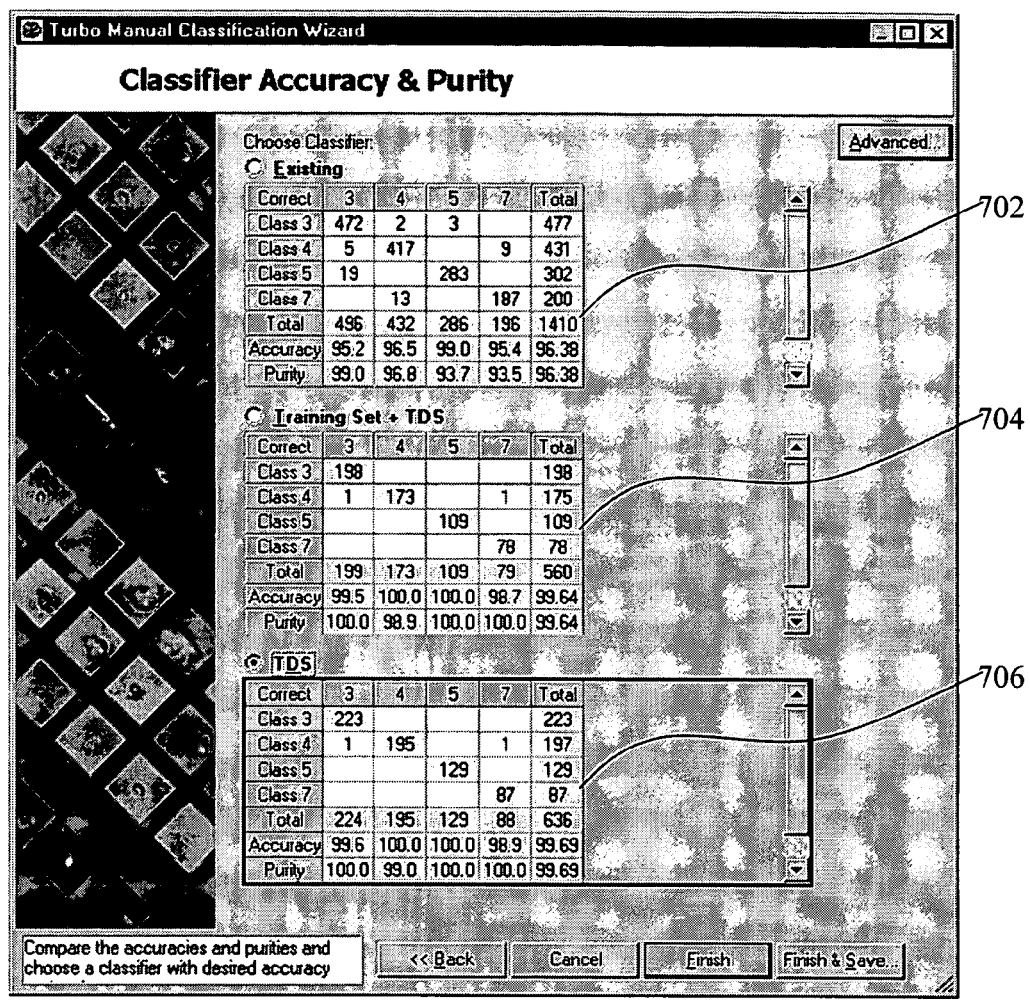
FIG. 7 illustrates accuracy and purity matrices for an example (1) classifier based on the existing training set, (2) a classifier based on a training set selected using the max/min algorithm (3) a classifier based on a training set combining the existing training set and a training set selected using the max/min algorithm.

If the existing classification scheme is to be used, it is then determined whether more defects need to be classified in operation 610. If no other defects need to be classified, it is then determined whether a training set is present in operation 606. A training set may have been created using conventional methods or may have been created using the manual classification and training set formation techniques of the present invention. If a training set is present, purity and accuracy data is determined and presented for three different classifiers in operation 608. The purity and accuracy data is generally determined by comparing training set defects to manually classified defects. As shown in FIG. 7, an accuracy and purity matrix is shown for a classifier based on the existing training set (702), a classifier based on training set selected through max/min algorithm (706), and a classifier based on a training set combining the existing training set and training set selected from max/min algorithm (704). The user may then select the particular classifier to be used in operation 609.

Figure 8:
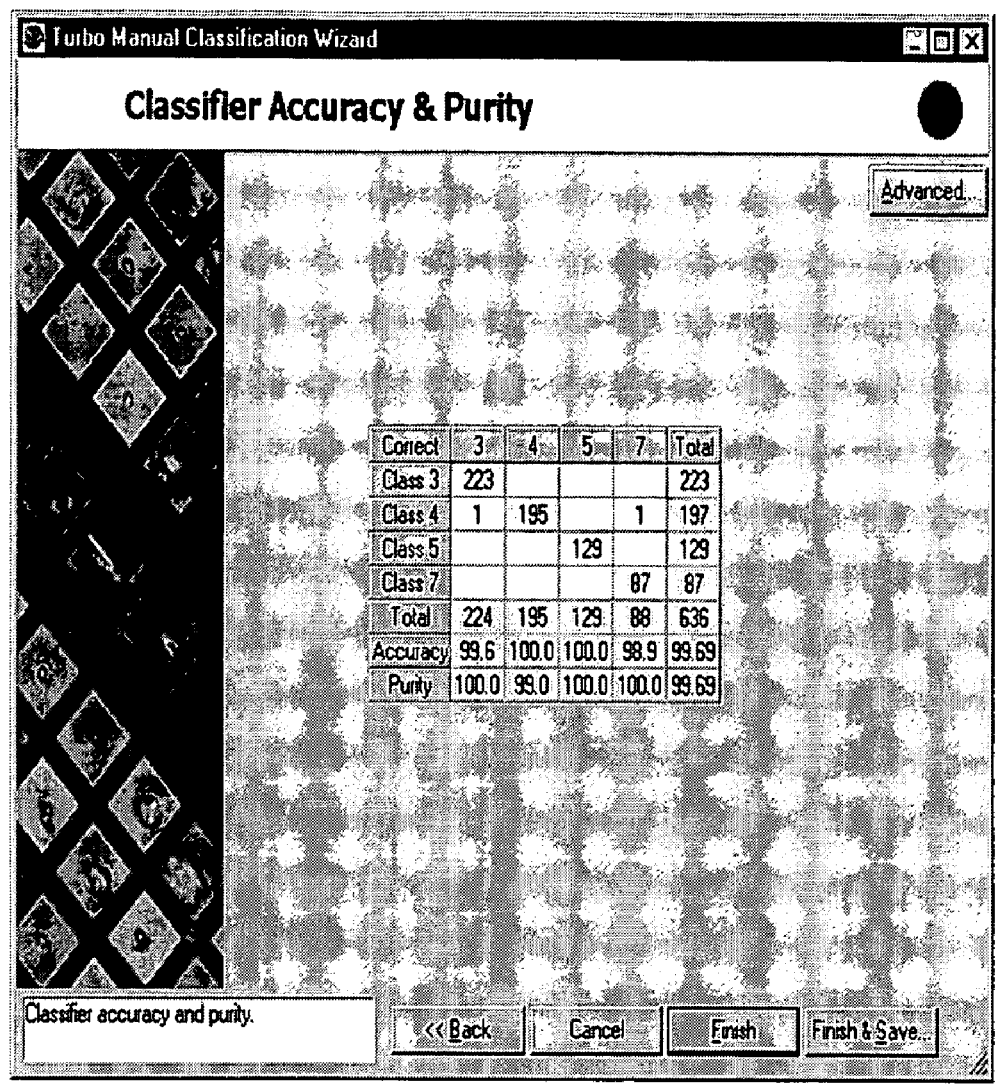
FIG. 8 is a screen shot of an accuracy and purity matrix for a classifier created based on a training set selected using the max/min algorithm.

However, if there are no manual codes present, it is then determined whether a supervised mode is selected (e.g., by the user) in operation 602. If a supervised mode is selected, the manual classification process (operation 102 of FIG. 1) is executed to produce classified defects according to inventive techniques of the present invention. A training set based on the classified defects is then formed in operation 613, and the training set is preferable formed based on implementing the max/min procedure on the classified defects. The user is then presented with an accuracy and purity matrix for the existing classification (and training set). FIG. 8 is a screen shot of an accuracy and purity matrix for a classifier created based on a training set selected using the max/min algorithm.

Figure 9:
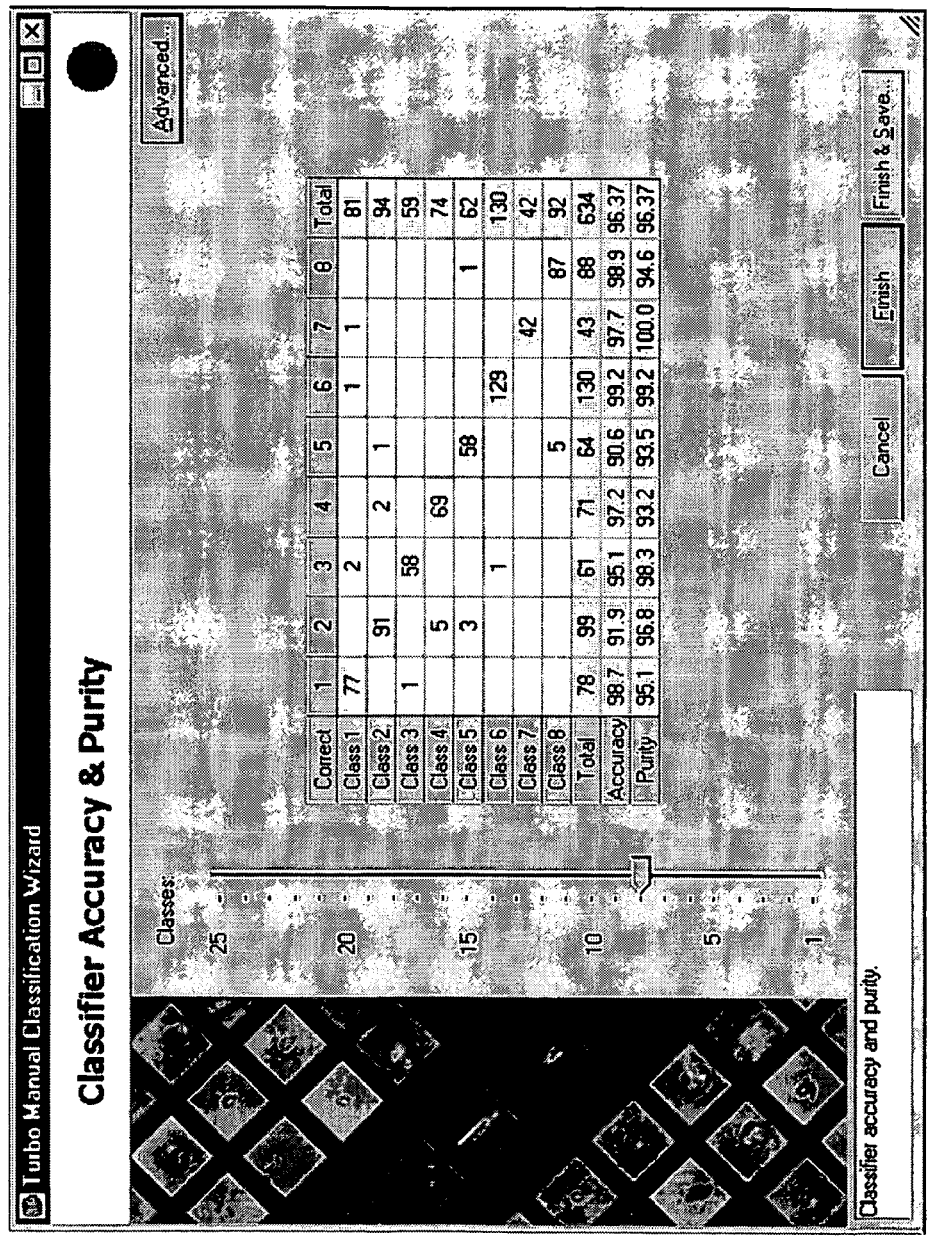
FIG. 9 is a screen shot of an accuracy and purity matrix for an example of a classifier created based on a training set selected using the max/min algorithm with the manual class codes assigned by natural grouping algorithm.

If the supervised mode is not selected, then an unsupervised mode is selected by default and a warning may be issued that the existing class codes and training set is going to be lost in operation 612. The user may be presented with an opportunity to prevent such loss and select a different classifier creation mode. After the warning is issued (and optionally the user has chosen to proceed), the defects are then grouped into groups (e.g., by natural grouping) and each group is assigned a unique class code in operation 616. A training set may then be formed based on the classified defects or by using the max/min procedure on the classified defects. The user may then be presented with an accuracy and purity matrix for the unsupervised classifier. FIG. 9 is a screen shot of an accuracy and purity matrix for an example of a classifier created based on a training set selected using the max/min algorithm with the manual class codes assigned by natural grouping algorithm.

Referring back to operation 610, if new defects need to be classified, the manual classification process (operation of FIG. 1) is executed and then operations 613 and 614 of FIG. 6 are executed.

Figure 10:
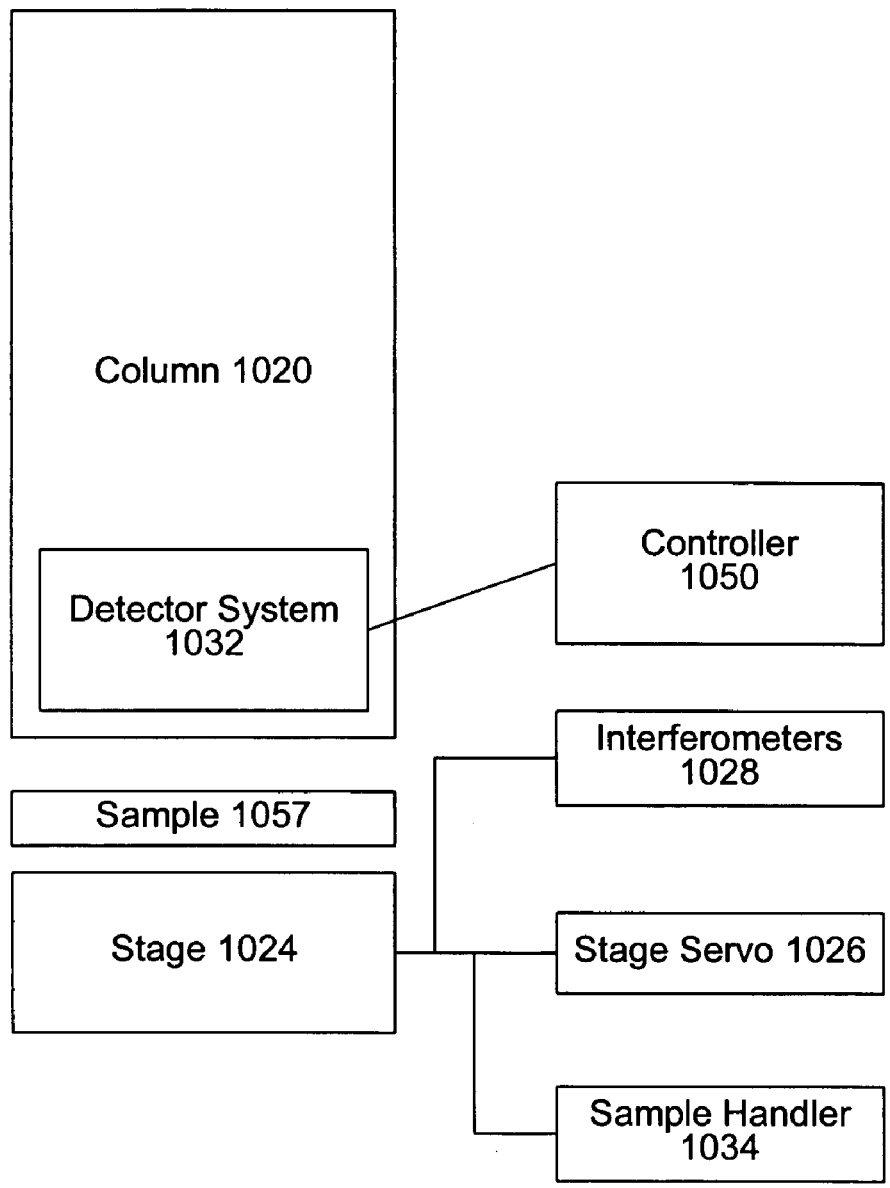
FIG. 10 is a diagrammatic representation of a defect image analysis system in accordance with one embodiment of the present invention.

The present invention may be implemented in any suitable combination of hardware and software. Such a system would likely include one or more processors and memory configured to implement the techniques of the present invention. FIG. 10 is a diagrammatic representation of an electron beam review system in which the techniques of the present invention may be implemented. The detail in FIG. 10 is provided for illustrative purposes. One skilled in the art would understand that variations to the system shown in FIG. 10 fall within the scope of the present invention. For example, FIG. 10 shows the operation of a particle beam (e.g., electron beam) with a continuously moving stage. However, many of the classification setup techniques described herein are also useful in the context of other testing devices, including particle beams operated in step and repeat mode. As an alternative to moving the stage with respect to the beam, the beam may be moved by deflecting the field of view with an electromagnetic lens. Alternatively, the beam column to be moved with respect to the stage.

Sample 1057 can be secured automatically beneath a particle beam 1020. The particle beam 1020 can be a particle beam such as an electron beam. The sample handler 1034 can be configured to automatically orient the sample on stage 1024. The stage 1024 can be configured to have six degrees of freedom including movement and rotation along the x-axis, y-axis, and z-axis. In one embodiment, the stage 1024 is aligned relative to the particle beam 1020 so that the x-directional motion of the stage is corresponds to an axis that is perpendicular to a longitudinal axis of inspected conductive lines. Fine alignment of the sample can be achieved automatically or with the assistance of a system operator. The position and movement of stage 1024 during the analysis of sample 1057 can be controlled by stage servo 1026 and interferometers 1028.

While the stage 1024 is moving in the x-direction, the inducer 1020 can be repeatedly deflected back and forth in the y direction. According to various embodiments, the inducer 1020 is moving back and forth at approximately 100 kHz. According to a preferred embodiment, the stage 1024 is grounded to thereby ground the substrate and any structure tied to the substrate (e.g., source and drains) to allow voltage contrast between the floating and grounded structures as the result of scanning the targeted features.

A detector 1032 can also be aligned alongside the particle beam 1020 to allow further defect detection capabilities. The detector 1032 as well as other elements can be controlled using a controller 1050. Controller 1050 may include a variety of processors, storage elements, and input and output devices. The controller may be configured to implement the classification setup techniques of the present invention. In one embodiment, the controller is a computer system having a processor and one or more memory devices.

Regardless of the controller's configuration, it may employ one or more memories or memory modules configured to store data, program instructions for the general-purpose inspection operations and/or the inventive techniques described herein. The program instructions may control the operation of an operating system and/or one or more applications, for example. The memory or memories may also be configured to store images of scanned samples, reference images, defect classification and position data, as well as values for particular operating parameters of the inspection system.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method of setting up an automatic defect classifier system for classifying semiconductor defects, the method comprising:
    (a) providing defect image data for a plurality of defects;
    (b) selecting one or more first representative sets of defects from the defects so as to optimize manual classification;
    (c) presenting each first representative set of defects and not the defects which are not part of the one or more first representative sets to a user for manual classification, wherein the defects which are not part of the one or more first representative sets are defined as non-reviewed defects;
    (d) after the user manually classifies each first representative set of defects so as to define a seed set, iteratively classifying the non-reviewed defects into a plurality of probable classes based on the seed set and iteratively presenting a second representative set of defects for each probable class which have a lowest confidence level to the user for possible reclassification, wherein the operations of iteratively classifying and iteratively presenting continue to be repeated without human intervention until the user's manual reclassification of any defect in any probable class does not result in such reclassified defect being reclassified into a different class than its previous probable class.

2. A method as recited in claim 1, wherein the iteratively classifying operation is based on the manual classifications and the re-classification by the user.

3. A method as recited in claim 1, further comprising grouping the defect image data into a plurality of groups of one or more defects, wherein a first representative set is selected and presented from each group.

4. A method as recited in claim 3, further comprising determining whether manual classification is present already for some of the defects, the one or more first representative sets being presented only when there is no manual classification present.

5. A method as recited in claim 1, wherein each first representative set of defects is a manageable subset of defects from the total defects.

6. A method as recited in claim 3, further comprising selecting a total number of the groups into which the defects are grouped.

7. A method as recited in claim 6, wherein the total number of the groups is user selectable or adjustable.

8. A method as recited in claim 1, wherein selecting each first representative set of defects includes selecting only a single defect from among defects which are substantially similar to be included within the each first representative set.

9. A method as recited in claim 1, wherein selecting each first representative set of defects includes selecting defects which are uniformly distributed across a feature space to be included within the each first representative set.

10. A method as recited in claim 1, wherein selecting each first representative set of defects includes selecting defects which are the most diverse to be included within the each first representative set.

11. A method as recited in claim 1, wherein the one or more first representative sets only includes a single first representative set and wherein selecting each first representative set of defects comprises:

when the defects total is less than three, selecting all of the defects to be included within the single first representative set; and when the defects total is equal to three or more, selecting defects based on a max/min algorithm until of the defects are selected to be included within the single first representative set.

12. A method as recited in claim 3, wherein selecting each first representative set of defects for each group comprises:

when the defects for the each group total less than three, selecting all of the defects from the each group to be included within the each first representative set for such group; and when the defects for the each group are equal to three or more, selecting defects from the each group based on a max/min algorithm until ¼ of the defects are selected to be included within the each first representative set for such each group.

13. A method as recited in claim 3, further comprising:

classifying the non-reviewed defects into a plurality of classes using each group's manual classification and any re-classification by the user when all the groups each have defects having the same manual classification, and wherein operation (d) is performed until all the groups each have defects having the same manual classification.

14. A method as recited in claim 13, wherein the defects are grouped and classified using a natural grouping procedure.

15. A method as recited in claim 13, further comprising:

adding any re-classified defects into the seed set when all defects within the second representative set of defects from each probable class fail to have a same class prior to repeating operation (d).

16. A method as recited in claim 15, further comprising:

updating the number of probable classes if changed by the user when all defects within the second representative set of defects from each probable class fail to have a same class prior to repeating operation (d); and modifying each manual classification that has been changed by the user when all defects within the second representative set of defects from each probable class fail to have a same class prior to repeating operation (d).

17. A method as recited in claim 15, the method further comprising:

adding any re-classified defects into the seed set even when all defects within the second representative set of defects from each probable class have a same class;

presenting a representative set of suspected misclassified defects to the user for possible re-classification when all defects within the second representative set of defects from each probable class have a same class; and classifying the non-reviewed defects based on the manual classification and re-classification defects of each probable class.

18. A method as recited in claim 2, wherein iteratively classifying the non-reviewed defects into a plurality of probable classes is based on a neural net procedure.

19. A method as recited in claim 2, wherein iteratively classifying the non-reviewed defects into a plurality of probable classes is based on a nearest neighbor procedure.

20. A method as recited in claim 1, wherein presenting the second representative set of defects from each probable class comprises:

determining a confidence level for each non-reviewed defect in each probable class; and selecting the non-reviewed defects from each probable class which have the lowest confidence level for inclusion in the second representative set for such probable class.

21. A method as recited in claim 20, wherein the confidence level for each non-reviewed defect within each probable class is calculated by:

$$\text{confidence value} = 1 - \frac{d_1}{d_2}$$

where $d_1$ represents the distance between the unknown defect and its nearest seed defect $D_s$ and $d_2$ represents the distance between the unknown defect and its second nearest seed defect which has a different manual code than the seed defect $D_s$.

22. A method as recited in claim 1, wherein each second representative set of defects for each probable class are presented within a user interface which includes a plurality of class identifiers wherein the user can associate selected ones of the representative defects for each probable class with a specific one of the class identifier to thereby re-classify such associated defects.

23. A method as recited in claim 22, wherein the user associates selected ones of the representative defects for each probable class with a specific one of the class identifier by selecting, dragging, and dropping the selected representative defects onto the specific class identifier.

24. A method as recited in claim 4, further comprising when there is manual classification present:

presenting the defects to the user for review; and repeating the operations for grouping, selecting and presenting a first representative set from each group, as well as operation (d).

25. A method as recited in claim 4, further comprising when there is manual classification present:

when there is a training set of classified defects for classifying unclassified defects present, using the training set as reference defects to detect new defects in other non-reference defects;

when there is not a training set of classified defects for classifying unclassified defects present, using the classified defects as reference defects to detect new defects in other non-reference defects;

when new defects are found, grouping the new defects and presenting to the user for classification; and when new defects are found, repeating operation (d) after the new defects are classified.

26. A method as recited in claim 4, further comprising creating a classifier system for classifying unclassified defects when the user selects an option for creating the classifier system, wherein creating the classifier system comprises:

repeating the operations for grouping, presenting the first representative set from each group; and operation (d), wherein the classified defects are used as seed defects for classifying unclassified defects as part of the classifier system, when the user selects a supervised mode;

using at least a portion of the classified defects as training defects for classifying the rest of the defects as part of the classifier system when the user selects using existing manual classes mode; and using a grouping procedure for assigning manual class codes to the defects and then using a portion of the defects as training defects for classifying the rest of defects as part of the classifier system when the user selects an unsupervised mode.

27. A method as recited in claim 26, further comprising:
when using existing manual classes mode is selected, presenting purity and accuracy matrices for a classifier based on (1) existing training defects, (2) a training set selected using the max/min algorithm (3) a training set combining the existing training set and a training set selected using the max/min algorithm; and
creating a classifier based on the user's selected from among the three classifiers.

28. A method as recited in claim 25, wherein the grouping procedure is a natural grouping procedure.

29. A method as recited in claim 1, further comprising maintaining a classifier by merging existing classifiers together, adding new type of defects into the classifier, adding new boundary defects into the classifier, and removing redundant defects from the classifier.

30. An apparatus operable to set up an automatic defect classifier system for classifying semiconductor defects, comprising:
one or more processors;
one or more memory, wherein at least one of the processors and memory are adapted for:
(a) providing defect image data;
(b) grouping the defect image data into a plurality of groups of one or more defects and selecting a first representative set of defects from each group so as to optimize manual classification;
(c) presenting the first representative set of defects from each group and not the defects which are not part of the first representative set from each group to a user for manual classification, wherein the defects which are not part of the first representative sets are defined as non-reviewed defects; and
(d) after the user manually classifies each first representative set of defects so as to define a seed set, iteratively classifying the non-reviewed defects into a plurality of probable classes based on the seed set and iteratively presenting a second representative set of defects for each probable class which have a lowest confidence level to the user for possible reclassification, wherein the operations of iteratively classifying and iteratively presenting continue to be repeated without human intervention until the user's manual reclassification of any defect in any probable class does not result in such reclassified defect being reclassified into a different class than its previous probable class.

31. An apparatus as recited in claim 30, wherein the iteratively classifying operation is based on the manual classifications and the re-classification by the user.

32. An apparatus as recited in claim 30, wherein selecting the first representative set of defects for each group includes selecting defects which are uniformly distributed among the group's defects to be included within the first representative set for such group.

33. An apparatus as recited in claim 30, wherein selecting the first representative set of defects for each group includes selecting defects which are the most diverse from the group's defects to be included within the first representative set for such group.

34. An apparatus as recited in claim 30, wherein selecting each first representative set of defects for each group comprises:

when the defects for the each group total less than three, selecting all of the defects from the each group to be included within the each first representative set for such group; and
when the defects for the each group are equal to three or more, selecting defects based on a max/min algorithm until ¼ of the defects from the each group are selected to be included within the each first representative set for such each group.

35. An apparatus as recited in claim 31, wherein at least one of the processors and memory are further adapted for:
adding any re-classified defects into the seed set when all defects within the second representative set of defects from each probable class fail to have a same class prior to repeating operation (d).

36. An apparatus as recited in claim 35, wherein at least one of the processors and memory are further adapted for:
adding any re-classified defects into the seed set even when all defects within the second representative set of defects from each probable class have a same class;
presenting a representative set of suspected misclassified defects to the user for possible re-classification when all defects within the second representative set of defects from each probable class have a same class; and
classifying the non-reviewed defects based on the manual classification and re-classification defects of each probable class.

37. An apparatus as recited in claim 30, wherein presenting the second representative set of defects from each probable class comprises:
determining a confidence level for each non-reviewed defect in each probable class; and
selecting the non-reviewed defects from each probable class which have the lowest confidence level for inclusion in the second representative set for such probable class.

38. An apparatus as recited in claim 31, wherein at least one of the processors and memory are further adapted for when there is manual classification present and:
when there is a training set of classified defects for classifying unclassified defects present, using the training set as reference defects to detect new defects in other non-reference defects;
when there is not a training set of classified defects for classifying unclassified defects present, using the classified defects as reference defects to detect new defects in other non-reference defects;
when new defects are found, grouping the new defects and presenting to the user for classification; and
when new defects are found, repeating operation (d) after the new defects are classified.

39. An apparatus as recited in claim 31, further comprising creating a classifier system for classifying unclassified defects when the user selects an option for creating the classifier system, wherein creating the classifier system comprises:
repeating the operations for grouping, presenting the representative set from each group; and operation (d), wherein the classified defects are used as seed defects for classifying unclassified defects as part of the classifier system, when the user selects a supervised mode;
using at least a portion of the classified defects as training defects for classifying the rest of the defects as part of the classifier system when the user selects using existing manual classes mode; and
using a grouping procedure for assigning manual class codes to the defects and then using a portion of the defects as training defects for classifying the rest of defects as part of the classifier system when the user selects an unsupervised mode.

40. An apparatus as recited in claim 39, wherein at least one of the processors and memory are further adapted for:
when using existing manual classes mode is selected, presenting purity and accuracy matrices for a classifier based on (1) existing training defects, (2) a training set selected using the max/min algorithm (3) a training set combining the existing training set and a training set selected using the max/min algorithm; and
creating a classifier based on the user's selected from among the three classifiers.

41. An apparatus as recited in claim 38, wherein the grouping procedure is a natural grouping procedure.

42. A computer program product for setting up an automatic defect classifier system for classifying semiconductor defects, the computer program product comprising:
at least one computer readable medium;
computer program instructions stored within the at least one computer readable product configured for:
(a) providing defect image data;
(b) grouping the defect image data into a plurality of groups of one or more defects and selecting a first representative set of defects from each group so as to optimize manual classification;
(c) presenting the first representative set of defects from each group and not the defects which are not part of the first representative set from each group to a user for manual classification, wherein the defects which are not part of the first representative sets are defined as non-reviewed defects; and
(d) after the user manually classifies each first representative set of defects so as to define a seed set, iteratively classifying the non-reviewed defects into a plurality of probable classes based on the seed set and iteratively presenting a second representative set of defects for each probable class which have a lowest confidence level to the user for possible reclassification, wherein the operations of iteratively classifying and iteratively presenting continue to be repeated without human intervention until the user's manual reclassification of any defect in any probable class does not result in such reclassified defect being reclassified into a different class than its previous probable class.

43. A computer program product as recited in claim 42, wherein the iteratively classifying operation is based on the manual classifications and the re-classification by the user.

44. An apparatus as recited in claim 42, wherein the computer program instructions stored within the at least one computer readable product further configured for:
maintaining a classifier by merging existing classifiers together, adding new type of defects into the classifier, adding new boundary defects into the classifier, and removing redundant defects from the classifier.

* * * * *

UNITED STATES PATENT AND TRADEMARK OFFICE
CERTIFICATE OF CORRECTION

PATENT NO.       : 7,359,544 B2
APPLICATION NO.  : 10/713628
DATED            : April 15, 2008
INVENTOR(S)      : Gao et al.

Page 1 of 1

It is certified that error appears in the above-identified patent and that said Letters Patent is hereby corrected as shown below:

In line 7 of claim 11 (column 13, line 7) change "max/min algorithm until" to --max/min algorithm until 1/4--.

Signed and Sealed this

Sixteenth Day of September, 2008

JON W. DUDAS
*Director of the United States Patent and Trademark Office*